US009900149B2

(12) United States Patent
Adikari et al.

(10) Patent No.: US 9,900,149 B2
(45) Date of Patent: Feb. 20, 2018

(54) AREA EFFICIENT CRYPTOGRAPHIC METHOD AND APPARATUS

(71) Applicant: Synopsys, Inc., Mountain View, CA (US)

(72) Inventors: A. A. Jithra Adikari, Ottawa (CA); Michael Borza, Ottawa (CA)

(73) Assignee: Synopsys, Inc., Mountain View, CA (US)

(*) Notice: Subject to any disclaimer, the term of this patent is extended or adjusted under 35 U.S.C. 154(b) by 474 days.

(21) Appl. No.: 14/459,708

(22) Filed: Aug. 14, 2014

(65) Prior Publication Data

US 2016/0344551 A1    Nov. 24, 2016

Related U.S. Application Data

(60) Provisional application No. 61/920,558, filed on Dec. 24, 2013.

(51) Int. Cl.
| | |
|---|---|
| *H04L 29/06* | (2006.01) |
| *G06F 21/00* | (2013.01) |
| *H04L 9/06* | (2006.01) |
| *G09C 1/00* | (2006.01) |
| *H04L 9/32* | (2006.01) |
| *G06F 21/72* | (2013.01) |

(52) U.S. Cl.
CPC .............. *H04L 9/0631* (2013.01); *G09C 1/00* (2013.01); *H04L 9/32* (2013.01); *H04L 2209/30* (2013.01)

(58) Field of Classification Search
CPC ....... H04L 9/32; H04L 9/3242; H04L 9/0631; H04L 2209/30; G09C 1/00
See application file for complete search history.

(56) References Cited

U.S. PATENT DOCUMENTS

| | | | | |
|---|---|---|---|---|
| 7,236,593 | B2 | 6/2007 | Lu | |
| 2003/0198345 | A1* | 10/2003 | Van Buer | H04L 9/0631 380/43 |
| 2004/0139340 | A1* | 7/2004 | Johnson | G06F 21/14 713/194 |

(Continued)

FOREIGN PATENT DOCUMENTS

FR    2995110 A1 *  3/2014    .............. G06F 7/764

OTHER PUBLICATIONS

Renfei Liu, Keshab K. Parhi; "Fast composite field S-box architectures for advanced encryption standard"; May 2008; GLSVLSI '08: Proceedings of the 18th ACM Great Lakes symposium on VLSI; Publisher: ACM; pp. 65-70.*

(Continued)

*Primary Examiner* — David Garcia Cervetti
*Assistant Examiner* — Courtney Fields
(74) *Attorney, Agent, or Firm* — Jaquez Land Greenhaus LLP; Bruce W. Greenhaus, Esq.

(57) ABSTRACT

A method of improving the efficiency of an encryption/decryption process implementing the NIST FIPS 197 standard which includes a substitution box (S-box) and an inverse substitution (inverse S-box), comprises concatenating the S-box and inverse S-box to form a combined lookup table, and folding the concatenated table to generate a folded lookup table. The folded lookup table may be indexed for an encryption operation and for a decryption operation using a signal indicative of whether encryption or decryption is used.

8 Claims, 1 Drawing Sheet

(56) References Cited

U.S. PATENT DOCUMENTS

| | | | |
|---|---|---|---|
| 2008/0240422 A1 | 10/2008 | Ozturk | |
| 2008/0240426 A1* | 10/2008 | Gueron | G06F 12/0875 380/44 |
| 2012/0159186 A1* | 6/2012 | Farrugia | H04L 9/002 713/189 |
| 2014/0040334 A1* | 2/2014 | Burgess | G06F 1/0353 708/235 |

OTHER PUBLICATIONS

International Search Report, PCT/IB2014/064258, 3 pages, dated Mar. 25, 2015.

International Written Opinion, PCT/IB2014/064258, 3 pages, dated Mar. 25, 2015.

Permadi, Edi, Hardware Implementation of Rijndael SBOX using Logic Gates. Mar. 15, 2008, [retrieved on Feb. 26, 2015]. Retrieved from the Internet:<URL:https://edipermadi.wordpress.com/tag/encryption/>. *the whole document*.

"A Very Compact S-box for AES," D. Canright (2005), Workshop on Cryptographic Hardware and Embedded Systems (CHES2005), Lecture Notes in Computer Science, 3659, pp. 441-455.

* cited by examiner

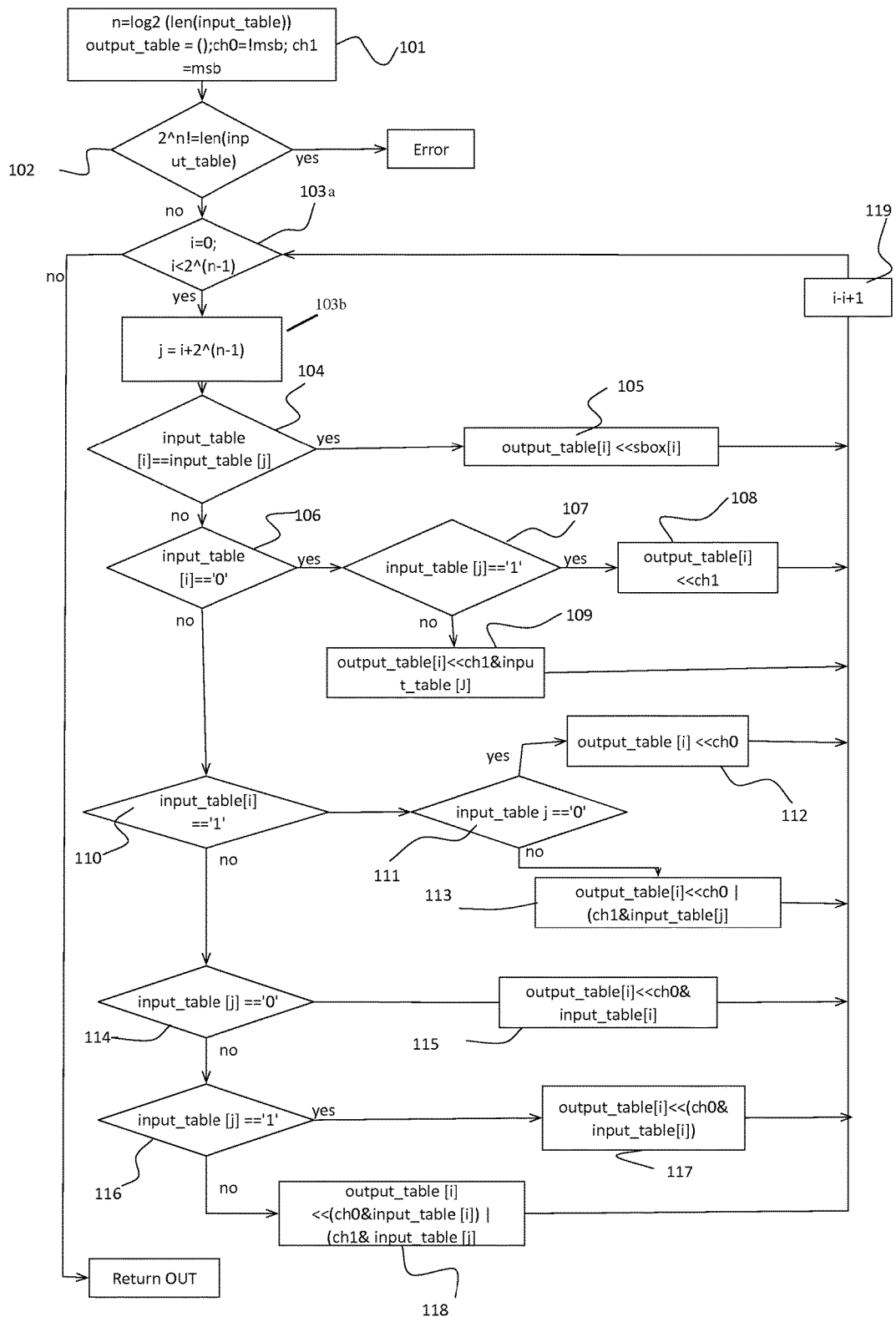

AREA EFFICIENT CRYPTOGRAPHIC METHOD AND APPARATUS

CROSS REFERENCE TO RELATED APPLICATIONS

This application claims the benefit of U.S. Provisional Patent Application No. 61/920,558, filed Dec. 24, 2013, which is hereby incorporated by reference in its entirety.

FIELD OF THE INVENTION

The present disclosure relates to cryptography and more particularly to methods and systems for cryptographic processing to make the communication, processing and storage of such data secure.

BRIEF SUMMARY

In accordance with one embodiment, a method and a system are provided to improve the efficiency of an encryption/decryption process implementing the NIST PIPS 197 standard which includes a substitution box (S-box) and an inverse substitution box (inverse S-box). The S-box and the inverse S-box are concatenated to form a combined lookup table, and the combined lookup table is folded to generate a folded lookup table. In one implementation, the folded lookup table is indexed for an encryption operation and for a decryption operation using a signal indicative of whether encryption or decryption is used.

In accordance with another embodiment, there is provided a method comprising: providing a lookup table including fixed values and variable values, the variable values being dependent on the operation being performed and the fixed values being fixed for each operation, the lookup table being responsive to its index to provide a first output value for a first operation and a second different output value for a second other operation.

In accordance with another embodiment, there is provided a method comprising: providing a lookup table comprising: comparing two lookup tables and inserting within a combined lookup table a value from the lookup tables when the value matches and a polarity for a control bit when the values are different, the polarity based on a signal indicative of the operation to be performed.

In some embodiments there is provided a method comprising inserting within an output value one of a fixed value and a calculated value, the calculated value being based on a control bit, and the output value comprising symbols including at least one fixed value and at least one calculated value.

In accordance with another embodiment, there is provided a cipher circuit comprising a memory having a lookup table stored therein; an indexing circuit for retrieving from the memory a lookup table value for forming part of an output value, the lookup table value comprising a plurality of symbols; and a processing circuit for processing some symbols within the output value and based on a symbol indicative of a present operation to provide the rest of the output value, wherein different output values result for a same index for different present operations.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

The single FIGURE is an example of a combined lookup table for supporting encryption and decryption operations from a single lookup table.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Cryptographic systems provide strong guarantees about security aspects such as confidentiality, data origin integrity and other aspects by combining the data to be protected using strong mathematical processes combined with secret data usually referred to as keys. One common technique to implement a cryptographic system is referred to as block cipher.

The document NIST, *FIPS197—Advanced encryption standard*, November 2001 [1], is the standard for Advanced Encryption Standard (AES) technology generally used for block ciphering. AES is often implemented within FPGAs or ASICs which have limited resources for a given cost. There is often a significant advantage in improving spatial efficiency of implementations as often this allows for use of a less expensive component. Even in non FPGA and non ASIC application there are advantages to reduced layout space and reduced final cost.

In FIPS 197 [1], incorporated herein by reference in its entirety, the S-box table (FIG. 7 of [1]) is used for the SubBytes( ) transformation of the ciphering process. Similarly the inverse S-box table (FIG. 14 of [1]) is used for the InvSubBytes( ) transformation for the inverse cipher process. To improve the spatial efficiency and in some case speed up the implementation of an AES, the S-box and inverse S-box (invS-box) tables are implemented using look-up-tables (LUT). Though this may improve performance in terms of speed, this approach increases the chip area (number of gates) significantly.

In an embodiment disclosed herein, the LUT-based S-box and invS-box are combined to reduce the area used by an AES core. This embodiment is applicable to many encryption technologies and more particularly to encryption technologies in which the non-linear function is a Galois field operator.

The values in the tables of FIGS. 7 and 14 of FIPS 197 [1] are combined, for example, as described below to provide reduced area (gate savings) of approximately ~10-15%. The corresponding additional logic in the critical path only reduces the maximum operating frequency by about ~2-3%.

Indexing 0x5a as an example returns:
S-box[5a]=1011 1110 (from FIG. 7 of FIPS 197 [1])
invS-box[5a]=0100 0110 (from FIG. 14 of FIPS 197 [1])

Assume that a signal "e" is high if an encryption process is activated, and low otherwise. When the decryption process is activated, signal "d" is high, otherwise "d" is low.

Therefore:

d=NOT[e] and e=NOT[d], where NOT is the logic inverse function.

therefore,

S-box[5a]=invS-box[5a]=edee e110

Therefore it is possible to use the same table entry for the ciphering and inverse ciphering process. An exemplary combined table (see table 1 below) is indexed in decimal value such that combS-box[90]=edee e110

By replacing "e" and "d" with their respective signals during the ciphering or inverse ciphering process, the output value equivalent to using the S-box or invS-box is achieved using a single table (combS-box).

TABLE 1

| input (Decimal Value) | MSB | | | output | | | | LSB |
|---|---|---|---|---|---|---|---|---|
| 0 | 0 | 1 | e | d | 0 | 0 | 1 | e |
| 1 | 0 | e | e | e | 1 | e | 0 | d |
| 2 | 0 | 1 | 1 | e | d | e | 1 | e |
| 3 | d | 1 | e | 1 | e | d | e | 1 |
| 4 | e | e | 1 | 1 | 0 | 0 | e | 0 |
| 5 | 0 | e | 1 | d | e | d | 1 | e |
| 6 | d | e | 1 | 0 | e | 1 | e | 1 |
| 7 | e | e | d | d | d | e | 0 | e |
| 8 | d | 0 | 1 | 1 | d | d | d | d |
| 9 | 0 | d | 0 | 0 | 0 | 0 | 0 | e |
| 10 | d | e | 1 | 0 | 0 | e | 1 | 1 |
| 11 | d | 0 | e | d | 1 | d | 1 | e |
| 12 | 1 | e | e | e | e | e | e | d |
| 13 | 1 | 1 | d | 1 | 0 | e | 1 | 1 |
| 14 | 1 | d | e | d | e | d | 1 | 1 |
| 15 | d | 1 | 1 | 1 | d | e | 1 | d |
| 16 | e | 1 | d | 1 | d | e | e | 0 |
| 17 | 1 | d | d | 0 | 0 | 0 | 1 | d |
| 18 | e | e | d | d | 1 | 0 | 0 | 1 |
| 19 | d | e | e | e | e | e | d | e |
| 20 | 1 | e | e | 1 | 1 | 0 | 1 | d |
| 21 | 0 | e | d | e | 1 | d | d | 1 |
| 22 | d | 1 | d | d | d | 1 | 1 | 1 |
| 23 | 1 | e | e | e | 0 | d | d | d |
| 24 | e | 0 | 1 | d | e | 1 | 0 | e |
| 25 | 1 | e | 0 | e | d | 1 | d | 0 |
| 26 | e | d | e | 0 | 0 | 0 | 1 | d |
| 27 | e | d | e | 0 | e | 1 | e | e |
| 28 | 1 | d | 0 | e | e | 1 | 0 | 0 |
| 29 | 1 | d | e | d | d | 1 | d | 0 |
| 30 | d | 1 | 1 | e | d | 0 | e | d |
| 31 | 1 | 1 | 0 | 0 | d | 0 | d | d |
| 32 | e | d | e | 1 | 0 | 1 | e | e |
| 33 | e | 1 | 1 | 1 | 1 | e | d | 1 |
| 34 | 1 | 0 | 0 | 1 | 0 | d | e | e |
| 35 | 0 | 0 | 1 | d | 0 | e | 1 | 0 |
| 36 | d | 0 | 1 | e | 0 | 1 | 1 | 0 |
| 37 | d | d | e | e | e | e | 1 | e |
| 38 | e | e | 1 | e | 0 | e | 1 | 1 |
| 39 | e | e | d | d | 1 | 1 | 0 | d |
| 40 | d | d | 1 | e | d | 1 | d | 0 |
| 41 | e | d | e | 0 | d | 1 | 0 | e |
| 42 | 1 | e | e | d | 0 | 1 | 0 | 1 |
| 43 | e | e | e | e | d | 0 | d | 1 |
| 44 | 0 | 1 | e | e | 0 | 0 | d | e |
| 45 | 1 | 1 | d | 1 | 1 | 0 | d | 0 |
| 46 | d | d | e | e | 0 | 0 | d | 1 |
| 47 | 0 | d | 0 | e | d | 1 | d | e |
| 48 | 0 | 0 | 0 | 0 | d | e | 0 | 0 |
| 49 | e | e | d | 0 | d | 1 | 1 | e |
| 50 | d | 0 | 1 | 0 | 0 | e | 1 | 1 |
| 51 | e | 1 | d | 0 | 0 | d | 1 | e |
| 52 | 0 | 0 | d | e | 1 | 0 | 0 | 0 |
| 53 | 1 | d | 0 | 1 | d | e | e | d |
| 54 | 0 | 0 | d | 0 | 0 | 1 | 0 | e |
| 55 | 1 | 0 | d | 1 | e | 0 | 1 | 0 |
| 56 | 0 | d | d | d | 0 | 1 | 1 | e |
| 57 | 0 | d | 0 | 1 | d | 0 | 1 | d |
| 58 | 1 | 0 | d | 0 | 0 | 0 | d | 0 |
| 59 | e | 1 | e | 0 | d | 0 | e | d |
| 60 | e | 1 | 1 | 0 | 1 | d | e | 1 |
| 61 | d | 0 | e | 0 | d | e | 1 | 1 |
| 62 | 1 | d | e | 1 | 0 | 0 | e | d |
| 63 | 0 | e | 1 | e | 0 | 1 | 0 | 1 |
| 64 | 0 | d | d | d | e | 0 | d | e |
| 65 | 1 | d | d | d | 0 | 0 | e | e |
| 66 | d | d | 1 | d | e | 1 | d | 0 |
| 67 | 0 | d | d | e | e | d | e | 0 |
| 68 | d | 0 | 0 | e | e | d | 1 | e |
| 69 | 0 | 1 | 1 | 0 | 1 | e | e | 0 |
| 70 | d | e | 0 | 1 | 1 | 0 | e | 0 |
| 71 | e | 0 | e | d | 0 | d | d | 0 |
| 72 | d | 1 | 0 | 1 | 0 | d | e | 0 |
| 73 | d | 0 | 1 | e | d | e | e | e |
| 74 | e | 1 | 0 | 1 | d | 1 | e | 0 |
| 75 | 1 | d | e | d | d | e | e | e |
| 76 | 0 | d | e | d | 1 | d | 0 | 1 |
| 77 | e | 1 | 1 | 0 | 0 | d | e | 1 |
| 78 | d | 0 | 1 | d | e | 1 | 1 | e |
| 79 | 1 | 0 | 0 | d | 0 | e | d | 0 |
| 80 | 0 | 1 | d | e | d | d | e | e |
| 81 | e | 1 | d | 1 | 0 | 0 | 0 | e |
| 82 | 0 | d | 0 | 0 | 0 | 0 | 0 | 0 |
| 83 | e | 1 | e | d | e | e | 0 | 0 |
| 84 | d | d | 1 | d | d | d | 0 | d |
| 85 | 1 | 1 | 1 | e | 1 | 1 | 0 | d |
| 86 | 1 | 0 | 1 | 1 | d | 0 | 0 | 1 |
| 87 | d | 1 | 0 | 1 | 1 | 0 | 1 | e |
| 88 | 0 | 1 | e | d | 1 | d | 1 | 0 |
| 89 | e | e | 0 | d | e | d | e | 1 |
| 90 | e | d | e | e | e | 1 | 1 | 0 |
| 91 | 0 | d | e | 1 | e | d | d | 1 |
| 92 | d | e | d | 0 | e | d | 1 | d |
| 93 | d | e | 0 | 0 | 1 | 1 | 0 | d |
| 94 | d | e | 0 | 1 | 1 | d | 0 | d |
| 95 | 1 | e | 0 | 0 | e | 1 | e | e |
| 96 | 1 | e | 0 | 1 | 0 | 0 | 0 | 0 |
| 97 | 1 | 1 | e | d | 1 | e | e | e |
| 98 | 1 | 0 | 1 | 0 | 1 | 0 | 1 | d |
| 99 | e | e | e | e | 0 | e | e | e |
| 100 | d | e | 0 | 0 | d | d | e | e |
| 101 | d | e | d | d | 1 | 1 | 0 | e |
| 102 | d | d | e | 1 | 0 | 0 | 1 | 1 |
| 103 | e | 0 | 0 | 0 | e | d | e | d |
| 104 | d | 1 | d | d | 0 | 1 | d | 1 |
| 105 | 1 | 1 | 1 | e | e | d | 0 | e |
| 106 | 0 | 0 | 0 | d | d | 0 | e | 0 |
| 107 | 0 | e | e | e | e | 1 | e | 1 |
| 108 | d | e | d | 1 | d | 0 | 0 | 0 |
| 109 | d | 0 | 1 | 1 | e | e | d | d |
| 110 | e | d | 0 | e | e | 1 | e | 1 |
| 111 | e | 0 | e | 0 | e | d | d | 0 |
| 112 | d | 1 | 0 | 1 | 0 | 0 | 0 | e |
| 113 | e | 0 | 1 | 0 | d | d | e | e |
| 114 | 0 | e | 0 | d | d | d | d | 0 |
| 115 | 1 | 0 | 0 | 1 | 1 | 1 | 1 | 1 |
| 116 | 1 | d | 0 | e | 0 | 0 | 1 | 0 |
| 117 | e | 0 | d | 1 | 1 | 1 | d | 1 |
| 118 | 0 | 0 | e | e | 1 | d | d | d |
| 119 | e | e | e | e | 0 | e | d | e |
| 120 | 1 | d | e | e | e | e | 0 | e |
| 121 | 1 | 0 | 1 | e | d | 1 | 1 | d |
| 122 | 1 | e | d | 1 | 1 | d | e | d |
| 123 | 0 | 0 | e | 0 | 0 | 0 | d | 1 |
| 124 | 0 | 0 | 0 | e | 0 | 0 | 0 | 0 |
| 125 | e | e | e | 1 | e | e | 1 | 1 |
| 126 | 1 | e | e | e | d | 0 | 1 | e |
| 127 | e | 1 | d | e | d | 0 | 1 | d |
| 128 | e | e | d | d | 1 | e | d | e |

TABLE 1-continued

Combined S-box (combS-box)

| input (Decimal Value) | MSB | | | | | | | LSB |
|---|---|---|---|---|---|---|---|---|
| 129 | d | 0 | 0 | d | e | e | 0 | d |
| 130 | 0 | 0 | 0 | 1 | 0 | 0 | e | 1 |
| 131 | e | 1 | e | 0 | e | e | 0 | d |
| 132 | 0 | 1 | 0 | e | 1 | 1 | 1 | 1 |
| 133 | e | d | d | e | 0 | 1 | 1 | 1 |
| 134 | d | 1 | 0 | d | d | 1 | 0 | 0 |
| 135 | d | d | d | e | d | e | 1 | e |
| 136 | 1 | e | 0 | d | 0 | 1 | d | d |
| 137 | 1 | d | 1 | d | 0 | e | 1 | e |
| 138 | d | 1 | e | e | 1 | 1 | 1 | d |
| 139 | d | d | e | e | 1 | 1 | d | e |
| 140 | d | 1 | 1 | d | 0 | e | 0 | 0 |
| 141 | d | e | d | 1 | e | 1 | 0 | e |
| 142 | d | d | d | e | e | d | d | e |
| 143 | 0 | 1 | 1 | 1 | 0 | 0 | 1 | 1 |
| 144 | d | e | e | d | 0 | d | d | 0 |
| 145 | 1 | 0 | d | 0 | d | d | 0 | e |
| 146 | 0 | 1 | d | d | e | 1 | e | e |
| 147 | e | e | d | e | e | e | d | 0 |
| 148 | d | d | 1 | 0 | 0 | d | 1 | d |
| 149 | d | 0 | 1 | 0 | 1 | d | e | d |
| 150 | e | 0 | d | 1 | 0 | d | 0 | d |
| 151 | 1 | 0 | 0 | 0 | e | d | 0 | d |
| 152 | d | 1 | d | 0 | 0 | e | 1 | 0 |
| 153 | 1 | 1 | 1 | d | 1 | e | e | d |
| 154 | e | 0 | 1 | 1 | e | d | d | d |
| 155 | d | d | d | e | d | e | 0 | 0 |
| 156 | e | e | 0 | 1 | 1 | 1 | e | 0 |
| 157 | 0 | 1 | d | 1 | e | 1 | e | d |
| 158 | d | d | 0 | d | 1 | d | 1 | 1 |
| 159 | e | 1 | d | e | 1 | d | 1 | e |
| 160 | e | 1 | e | 0 | 0 | d | d | d |
| 161 | d | d | 1 | 1 | 0 | 0 | e | d |
| 162 | 0 | 0 | e | 1 | 1 | 0 | 1 | 0 |
| 163 | 0 | d | d | d | e | 0 | e | d |
| 164 | 0 | e | 0 | d | 1 | 0 | 0 | 1 |
| 165 | 0 | 0 | d | 0 | d | e | e | d |
| 166 | d | d | e | 0 | 0 | 1 | 0 | d |
| 167 | d | e | 0 | e | 1 | e | 0 | d |
| 168 | e | 1 | d | 0 | d | 1 | e | d |
| 169 | 1 | e | d | 1 | 0 | d | 1 | 1 |
| 170 | e | d | 1 | 0 | e | e | d | 0 |
| 171 | 0 | e | e | 0 | d | d | 1 | 0 |
| 172 | 1 | 0 | d | e | d | 0 | d | e |
| 173 | e | 0 | 0 | 1 | d | e | 0 | e |
| 174 | 1 | e | 1 | d | d | 1 | d | 0 |
| 175 | 0 | e | e | 1 | 1 | 0 | d | 1 |
| 176 | 1 | 1 | 1 | d | d | 1 | e | e |
| 177 | e | 1 | 0 | d | e | d | d | 0 |
| 178 | 0 | 0 | 1 | 1 | d | 1 | 1 | e |
| 179 | 0 | 1 | e | 0 | 1 | e | d | 1 |
| 180 | 1 | d | 0 | 0 | e | 1 | d | e |
| 181 | 1 | 1 | 0 | 1 | 0 | e | d | e |
| 182 | 0 | 1 | d | d | 1 | e | e | d |
| 183 | e | 0 | 1 | 0 | e | 0 | 0 | e |
| 184 | d | e | e | d | 1 | e | d | 0 |
| 185 | d | 1 | 0 | 1 | d | e | 1 | d |
| 186 | 1 | 1 | e | e | 0 | e | 0 | 0 |
| 187 | 1 | 1 | 1 | d | 1 | d | 1 | 0 |
| 188 | 0 | 1 | 1 | d | d | e | 0 | e |
| 189 | d | 1 | e | e | 1 | d | e | d |
| 190 | e | d | e | d | 1 | e | 1 | 0 |
| 191 | d | d | d | d | e | 0 | 0 | 0 |
| 192 | e | 0 | e | 1 | 1 | d | 1 | d |
| 193 | d | 1 | e | 1 | 1 | d | 0 | d |
| 194 | d | 0 | 1 | 0 | d | e | 0 | e |
| 195 | 0 | 0 | 1 | d | e | e | 1 | d |
| 196 | d | 0 | 0 | e | 1 | e | 0 | 0 |
| 197 | e | 0 | e | 0 | 0 | 1 | 1 | d |
| 198 | 1 | d | e | e | 0 | 1 | d | d |
| 199 | e | e | d | d | 0 | e | e | d |
| 200 | 1 | e | 1 | d | e | 0 | 0 | d |
| 201 | e | e | 0 | 1 | e | e | d | e |
| 202 | 0 | e | e | 1 | 0 | e | 0 | 0 |
| 203 | 0 | d | 0 | 1 | 1 | e | e | 1 |
| 204 | 0 | e | d | 0 | e | d | 1 | 1 |
| 205 | 1 | 0 | e | e | e | e | 0 | e |
| 206 | 1 | d | d | 0 | 1 | d | e | e |
| 207 | e | d | 0 | d | 1 | d | 1 | d |
| 208 | 0 | 1 | 1 | e | 0 | 0 | 0 | 0 |
| 209 | 0 | d | e | 1 | e | e | e | d |
| 210 | e | d | 1 | 1 | d | 1 | d | 1 |
| 211 | d | e | 1 | 0 | d | e | e | d |
| 212 | 0 | e | 0 | d | 1 | 0 | 0 | d |
| 213 | d | 0 | d | d | 0 | d | e | 1 |
| 214 | e | 1 | e | e | d | e | 1 | 0 |
| 215 | 0 | 0 | 0 | 0 | 1 | 1 | e | d |
| 216 | 0 | e | 1 | 0 | d | d | 0 | 1 |
| 217 | d | d | 1 | e | 0 | 1 | 0 | 1 |
| 218 | 0 | 1 | d | 1 | d | e | 1 | e |
| 219 | 1 | 0 | e | 1 | 1 | d | d | 1 |
| 220 | 1 | 0 | 0 | d | 0 | e | 1 | d |
| 221 | 1 | 1 | 0 | 0 | d | 0 | 0 | 1 |
| 222 | d | 0 | 0 | 1 | 1 | 1 | 0 | e |
| 223 | 1 | d | d | e | 1 | 1 | 1 | d |
| 224 | 1 | e | 1 | 0 | 0 | 0 | 0 | e |
| 225 | 1 | 1 | 1 | e | 0 | 0 | 0 | 0 |
| 226 | e | 0 | d | 1 | 1 | 0 | d | d |
| 227 | 0 | d | 0 | e | d | d | 0 | 1 |
| 228 | d | e | 1 | 0 | 1 | d | d | e |
| 229 | e | e | d | e | 1 | 0 | d | e |
| 230 | 1 | d | d | d | e | 1 | e | d |
| 231 | 1 | 0 | d | 1 | 0 | e | 0 | 0 |
| 232 | 1 | d | 0 | e | 1 | 0 | e | e |
| 233 | d | d | d | e | 1 | e | 1 | d |
| 234 | 1 | 0 | d | d | e | 1 | 1 | 1 |
| 235 | e | e | 1 | d | 1 | d | 0 | e |
| 236 | 1 | e | 0 | 0 | e | e | 1 | d |
| 237 | 0 | 1 | 0 | 1 | 0 | e | d | 1 |
| 238 | d | 0 | e | d | 1 | 0 | 0 | d |
| 239 | e | 1 | d | e | e | e | e | 1 |
| 240 | e | 0 | 0 | d | e | 1 | d | d |
| 241 | e | 0 | 1 | 0 | d | 0 | d | 1 |
| 242 | e | 0 | 0 | 0 | e | d | 0 | e |
| 243 | 0 | d | d | d | 1 | 1 | d | e |
| 244 | 1 | 0 | 1 | 1 | 1 | e | 1 | e |
| 245 | e | 1 | 1 | d | 0 | 1 | 1 | d |
| 246 | d | 1 | 0 | d | 0 | d | 1 | 0 |
| 247 | 0 | e | 1 | 0 | e | d | d | 0 |
| 248 | d | 1 | d | 0 | 0 | 0 | 0 | 1 |
| 249 | e | d | d | e | 1 | 0 | 0 | 1 |
| 250 | 0 | 0 | e | d | e | 1 | 0 | e |
| 251 | 0 | d | d | 0 | e | e | 1 | 1 |
| 252 | e | d | e | 1 | 0 | d | 0 | d |
| 253 | 0 | e | d | e | 0 | e | 0 | d |
| 254 | e | 0 | e | e | 1 | d | e | e |
| 255 | 0 | d | d | 1 | d | 1 | e | d |

Alternatively, another method of simplifying the table for both encryption and decryption is used wherein the data stored is reduced over the use of two separate tables.

An automated process for determining a table is as follows:

Select a first row of an encryption table and a decryption table. When the table entries are the same, enter a same bit value. When the tables are different, enter either "e" when the table entry for encryption is a 1, or "d" when the table entry for encryption is a 0. Of course, it is also possible to assert encryption with a 0 and decryption with a 1, in which case the table entry would be the converse. When completed, the two tables are merged into a single lookup table.

Alternatively the combined table can be created using a folding algorithm. As a first step, the standard Inv S-box is appended to the standard S-Box to create a first table input_table that has 512 entries. The input_table is then folded, e.g., by using the algorithm illustrated by the flow chart in FIG. 1. The algorithm takes the input_table as an input. Variables are initialized in step 101, and n is set to the length of the input_table. In this embodiment, ch0 represents "e" and ch1 represents "d." A check can be made in step 102 to ensure that the length of the table is calculated properly. A recursive loop 119 indexes every entry of the first half of the input_table (in this case the S-box) until step 103a determines that all the entries in the first half of the table have been indexed and creates another table referred to as output_table, in this example. The output_table is therefore half the size of the input_table, and when using the algorithm, using the standard S-box concatenated with the standard inv S-box, the output_table is equivalent to Table 1 above. The output_table can optionally be used as an input to the folding algorithm, again in order to reduce the size further by half.

Within the recursive loop 119, the entries of the first half of the table are compared in step 104 with the same location entry in the second half of the input_table. Variable i is used to index each entry in the first table. Variable $j=i+2^{(n-1)}$ is used to index the same location in the second half of the table in step 103b.

If the entries at index i and j of the input_table are determined to have the same value in step 104, then step 105 sets the entry at index i of the output_table to that value, and the next iteration is performed at step 119.

If step 106 determines that the input_table at entry i is "0" (zero), and step 107 determines that the input_table at entry j is "1" (one), then step 108 sets the output_table at entry i set to ch1. Otherwise, step 109 sets the output_table at entry i to the logical AND of ch1 and input_table at entry j, and then the next iteration for i=i+1 is performed at step 119.

If step 110 determines that the input_table at entry i is "1" (one), and step 111 determines that the input_table at entry j is "0" (zero), then step 112 sets the output_table at entry i to ch0. Otherwise, step 113 sets the output_table at entry i to the logical OR of ch0 with the logical AND of ch1 and input_table at entry j 113, and then the next iteration for i=i+1 is performed at step 119.

If step 114 determines that the input_table at entry j is "0" (zero), then step 115 sets the output_table at entry i to the logical AND of ch0 and the input_table at entry i. Otherwise, if step 116 determines that the input_table at entry j equals "1" (one), step 117 sets the output_table at entry i to the logical OR between ch1 and the logical AND between ch0 and input_table at i. Otherwise, step 118 sets the output_table at entry i to the logical OR between the logical AND between ch0 and the input_table at entry i and the logical AND between ch1 and the input_table at entry j.

The iteration performed at step 119 continue until all entries have been done at which point the output_table contains all entries for a table half the size of the input_table.

Any of the methods, algorithms, implementations, or procedures described herein can include machine-readable instructions for execution by: (a) a processor, (b) a controller, and/or (c) any other suitable processing device. Any process, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Further, although a specific process is described with reference to flowcharts depicted herein, persons of ordinary skill in the art will readily appreciate that many other methods of implementing the example machine-readable instructions may alternatively be used. For example, the order of execution of the blocks may be changed, and/or some of the blocks described may be changed, eliminated, or combined.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of improving efficiency of encryption/decryption process that includes a substitution box (S-box) implemented as a first lookup table and an inverse substitution box (inverse S-box) implemented as a second lookup table, said method comprising generating a combined lookup table by comparing the two lookup tables and inserting within the combined lookup table a value from the lookup tables when the value matches and a polarity for a control bit when the values are different.

2. The method of claim 1 which includes indexing the combined lookup table for an encryption operation and for a decryption operation using a signal indicative of whether encryption or decryption is used.

3. The method of claim 1 in which the combined lookup table is responsive to said index to provide a first output value for a first operation, and a second different output value for a second other operation.

4. The method of claim 1 which includes inserting within an output value one of a fixed value and a calculated value, the calculated value being based on a control bit, and the output value comprising symbols including at least one fixed value and at least one calculated value.

5. An encryption/decryption system that includes a second lookup table, said system comprising a memory containing a combined lookup table formed by comparing the two lookup tables and inserting within the combined lookup table a value from the lookup tables when the value matches and a polarity for a control bit when the values are different to produce a combined lookup table that is smaller than the combination of the first and second lookup table, and a processor adapted to encrypt and decrypt data according using said combined table.

6. The system of claim 5 in which said combined lookup table is indexed using a signal indicative of whether encryption or decryption is to be performed.

7. The system of claim 5 which includes a cipher circuit comprising a memory having the combined lookup table stored therein; an indexing circuit for retrieving from the combined lookup table, a lookup table value used to form at least part of an output value, the lookup table value comprising a plurality of symbols; and a processing circuit for processing some of the plurality of symbols within the output value based on a present operation, such that a value is associated with the symbols within the output value to provide different output values for a same index for different present operations.

8. The system of claim 5 in which the combined lookup table includes variable values dependent on the encryption or decryption operation being performed, and fixed values that are fixed for each operation.

* * * * *